United States Patent [19]
Sadr et al.

[11] Patent Number: 6,099,788
[45] Date of Patent: *Aug. 8, 2000

[54] METHOD OF MAKING A PROTECTIVE BOOT FOR AN AUTOMOTIVE COMPONENT

[75] Inventors: Changize Sadr, North York; Jamie White, Caledon East, both of Canada

[73] Assignee: Salflex Polymers Ltd.

[ * ] Notice: This patent issued on a continued prosecution application filed under 37 CFR 1.53(d), and is subject to the twenty year patent term provisions of 35 U.S.C. 154(a)(2).

[21] Appl. No.: 08/995,408

[22] Filed: Dec. 19, 1997

[51] Int. Cl.$^7$ .................................................. B29C 49/20
[52] U.S. Cl. ........................... 264/506; 264/68; 264/515; 264/516; 156/73.5
[58] Field of Search .............................. 264/68, 506, 523, 264/279.1, 516, 271.1, 515; 156/73.5, 74, 304.6, 294

[56] References Cited

U.S. PATENT DOCUMENTS

| | | | |
|---|---|---|---|
| 4,047,739 | 9/1977 | Aitken | 285/21 |
| 4,469,337 | 9/1984 | Yokoi et al. | 277/212 |
| 4,529,213 | 7/1985 | Goodman | 277/212 |
| 4,678,064 | 7/1987 | Adachi et al. | 188/73 |
| 4,681,646 | 7/1987 | Pinto et al. | 156/157 |
| 4,786,272 | 11/1988 | Baker | 464/175 |
| 4,936,811 | 6/1990 | Baker | 464/175 |
| 5,098,344 | 3/1992 | Zollinger | 464/175 |
| 5,295,914 | 3/1994 | Milavec | 464/175 |
| 5,318,740 | 6/1994 | Sadr et al. | 264/506 |
| 5,626,808 | 5/1997 | Miyajima | 264/161 |
| 5,853,178 | 12/1998 | Wydra et al. | 277/636 |

*Primary Examiner*—Jan H. Silbaugh
*Assistant Examiner*—Stefan Staicovici
*Attorney, Agent, or Firm*—Bereskin & Parr

[57] ABSTRACT

A blow molded product which is generally tubular having a first and second open ends, a bellows section intermediate said first and second ends so that the product is flexible, and a skirt adjacent the second end, the skirt having an outer cylindrical outer surface and a lobed inner surface is provided. The bellows section is formed in a blow molding operation and the skirt is formed by injection molding. The final product is formed by thermally fusing the two portions together thereby forming a product with a substantially cylindrical external surface and a non-cylindrical internal surface which has lobes or other internal projections.

5 Claims, 13 Drawing Sheets

METHOD OF MAKING A PROTECTIVE BOOT FOR AN AUTOMOTIVE COMPONENT

FIELD OF THE INVENTION

This invention relates generally to protective boots for automobile components, and particularly to a protective boot for a constant velocity joint.

BACKGROUND OF THE INVENTION

Blow molding is a well-known technique used for manufacturing hollow plastic protective boots for automobile components. However, such boots typically have a complex shape which can present difficulties to blow molding such an article.

Protective boots used on automobile components, such as a boot for a constant velocity joint (CVJ), perform several functions including protecting the joint from outside dirt and debris, as well as maintaining lubricant around the joint. Many protective boots, however, must attach to automotive components which do not have a cylindrical external configuration to which the boot may be clamped. For example, due to the bearing configuration of typical constant velocity joints, the shaft to which one end of a CVJ boot must clamp is lobed, rather than cylindrical. Thus, in order to perform its protective functions properly, a CVJ boot requires a seal or bushing element at one end to be clamped between the boot and the shaft. The bushing has a tri-lobed internal configuration.

In use, however, the addition of this extra element increases the ways in which the protective boot may fail. For example, if there is an incomplete seal between the bushing and the boot, lubricant may be allowed to escape from the joint or contaminants allowed to enter.

Accordingly, there is a need for a single piece boot and bushing which provides a suitable external clamping surface and an internal irregular surface which can be configured to meet the requirements of a mechanical structure in association with which the product is to be used. Producing such a product is very difficult using conventional blow molding techniques. Conventional blow molding techniques cannot be used to comprise a lobed internal surface on a portion having a cylindrical outer surface because thermoplastic material spreads out evenly under the effect of blowing pressure in typical blow molding.

A technique which overcomes this problem is disclosed in the applicant's co-pending U.S. Patent application Ser. No. 08/694,234, filed Aug. 8, 1996, now U.S. Pat. No. 5,900,205, which is incorporated herein by reference. That application discloses a combined blow molding and compression molding technique in which a parison is confined in a mold and, prior to blowing, a core is introduced into the mold to move thermoplastic material axially, radially and circumferentially to form an integral boot and lobed bushing product. The method disclosed in that application has the limitation, however, that only a certain amount of thermoplastic material may be moved by the introduction of a core or slides into a mold prior to blow molding, thus limiting the size of lobes which may be formed on a bushing portion of an integral bushing and boot.

Accordingly, there is a need for a process which is capable of molding an integral thermoplastic boot and bushing having unlimited lobe size or having other internal sealing surface which is non-cylindrical.

SUMMARY OF THE INVENTION

In accordance with the invention there is a method for producing a thermoplastic protective boot for an automotive component which has a non-cylindrical sealing surface and which boot is required to seal against the component, the boot having an integral bushing for sealing against the component, the method comprising:

a) forming a boot element having a first portion, the first portion having a generally cylindrical first wall with generally cylindrical inner and outer surfaces, the first wall having a first diameter at the inner surface; and wherein the boot element is formed by blow molding;

b) forming a one piece bushing element having a generally cylindrical second wall with inner and outer surfaces, the outer surface of second wall having a generally cylindrical surface having a second diameter at the outer surface, the second diameter being approximately equal to the first diameter of the boot element, the inner surface of the bushing element having a non-cylindrical sealing surface, the non-cylindrical surface having a plurality of projections extending radially inwardly of the second wall so that the non-cylindrical sealing surface conforms to the non-cylindrical surface of the automotive component, each projection extending only partially circumferentially around the non-cylindrical sealing surface and wherein the bushing element is formed by injection molding;

c) positioning the bushing element so that the outer surface of the bushing element will be substantially in contact with the inner surface of the boot element; and d) integrating the boot element and the bushing element by thermally fusing the elements together to seal the outer surface of the bushing element to the inner surface of the first wall of the boot element.

In one aspect of the invention the bushing element is thermally fused to the boot element by spin welding.

In another aspect of the invention the bushing element is thermally fused to the boot element by placing a bushing element in a mold and blow molding a boot element so that the bushing element is incorporated in the boot element as the boot element is being formed.

BRIEF DESCRIPTION OF THE DRAWINGS

For a better understanding of the present invention, and to show more clearly how it may be carried into effect, reference will now be made by way of example to the accompanying drawings.

The drawings show a preferred embodiment of the present invention, in which.

DETAILED DESCRIPTION OF THE PREFERRED EMBODIMENT

Figure 1:
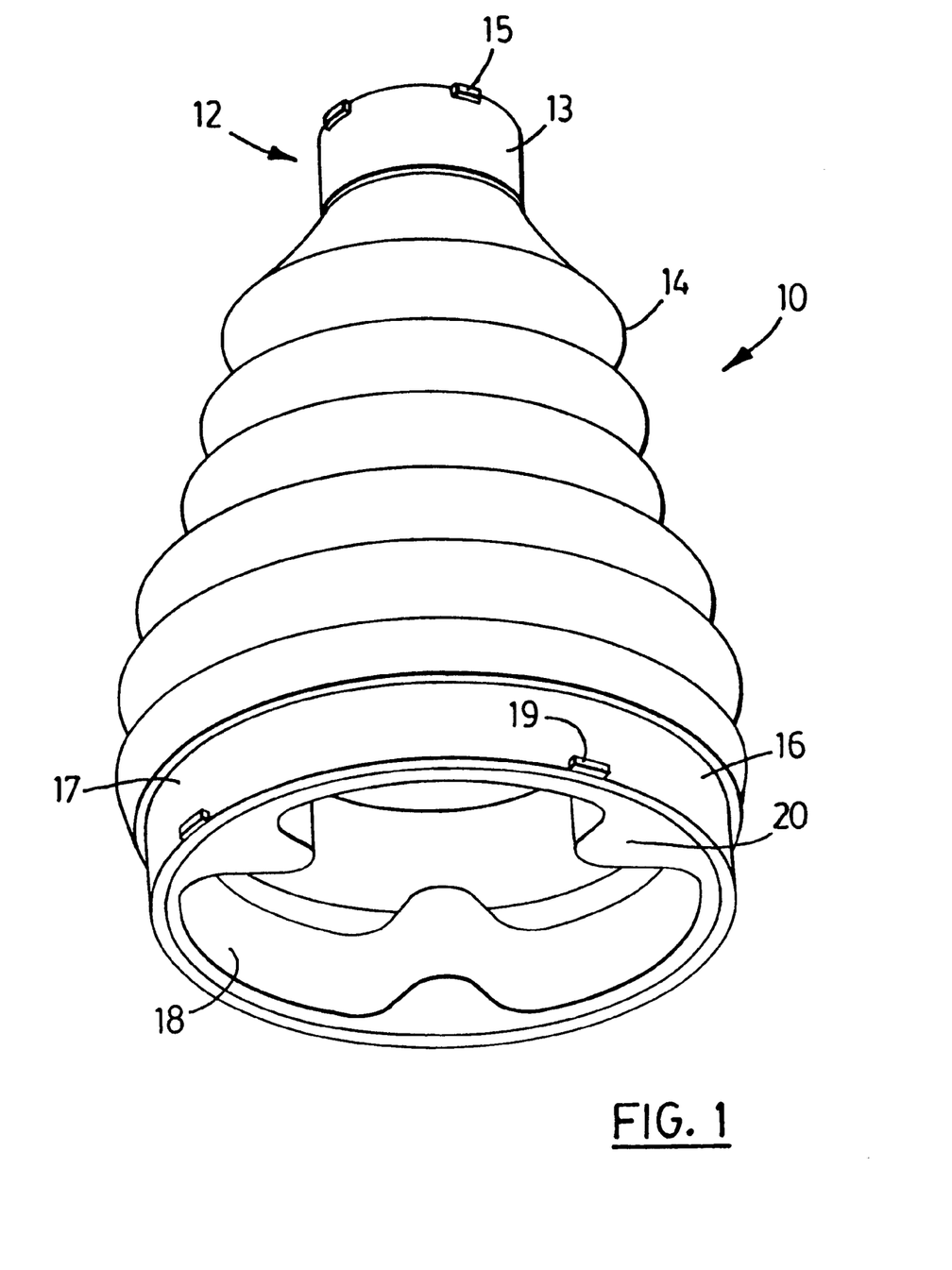
FIG. 1 shows a perspective view of a CVJ boot according to the present invention.

Referring now to FIG. 1, an automotive boot according to the present invention is indicated generally at 10. Boot 10 has a neck 12, a bellows 14 and a skirt 16. The skirt 16 is a generally cylindrical wall. Neck 12 and skirt 16 have generally cylindrical external surfaces 13 and 17 to accommodate, in use, encircling clamps, sometimes referred to as hose clamps, which will attach externally thereto to install boot 10 on a constant velocity joint. Projecting radially outwardly from surface 13 of neck 12 and surface 17 of skirt 16 are a series of retainer ribs 15 and 19, respectively. The function of retainer ribs 15 and 19 will be discussed below. An internal surface 18 of skirt 16 is generally cylindrical but has three lobes 20 extending radially inwardly from skirt 16.

Figure 2:
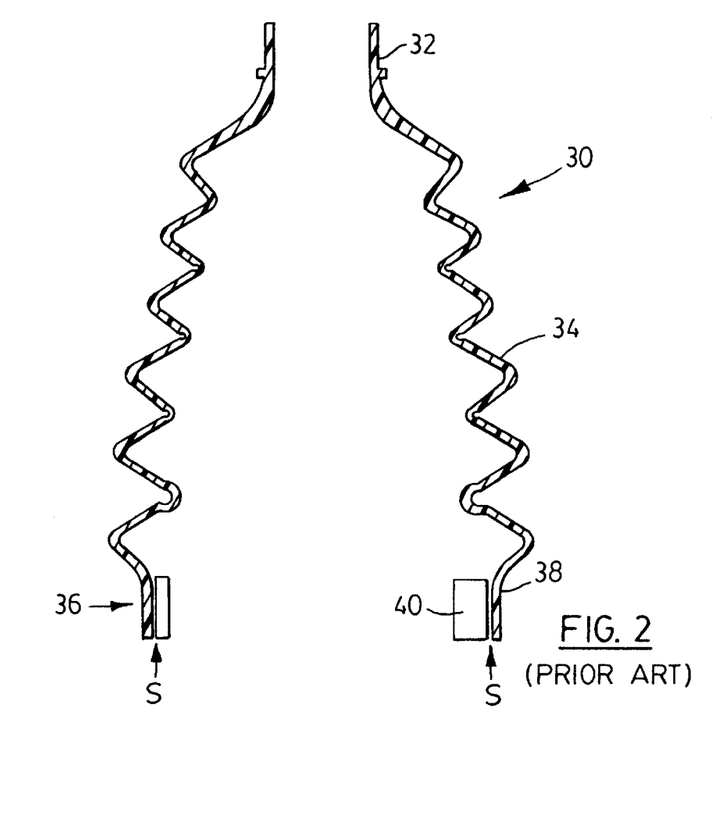
FIG. 2 shows a cross sectional side view of a typical boot of the prior art with a conventional bushing installed therein.

Referring now to FIG. 2, a CVJ boot in accordance with the prior art is shown generally at 30. Boot 30 has a neck 32, a bellows 34 and a skirt 36. As with boot 10, neck 32 and skirt 36 have generally cylindrical external surfaces. An internal surface 38 of skirt 36 is cylindrical to accommodate a seal or bushing 40.

Figure 3:
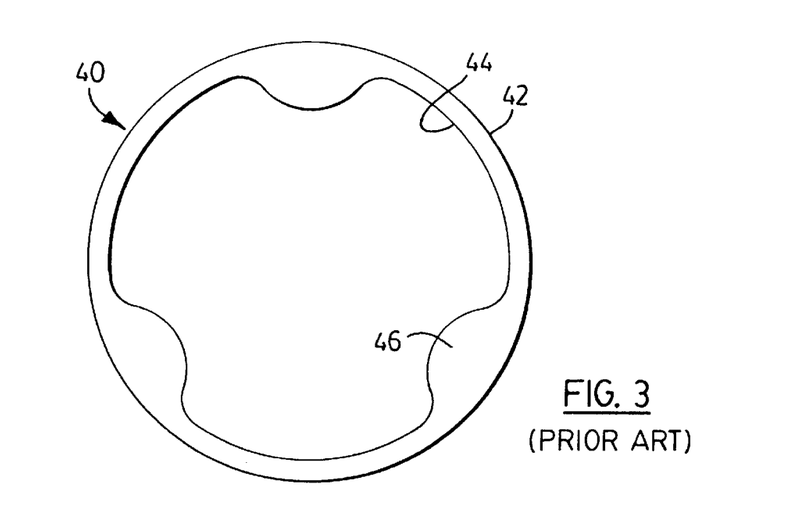
FIG. 3 shows a plan view of a typical bushing of the prior art.

Referring to FIG. 3, a bushing 40 according to the prior art is shown. Bushing 40 has a cylindrical outer surface 42 and an inner surface 44 having several lobed portions 46. As described above, traditionally, bushing 40 is required because the bearings of a constant velocity joint, to which skirt 36 must be clamped, are non-cylindrical.

In use, the bushing 40 and the boot 30 are installed on a constant velocity joint (not shown). The constant velocity joint includes two shaft-like elements, one having a diameter nominally equal to the inner diameter of neck 32 and the other end having a diameter nominally equal to the inner diameter of bushing 40. Hose clamps (not shown) are attached externally over neck 32 and skirt 38. The clamps are tightened against the structure of the joint to form a tight seal so that lubricant contained within the boot 30 may not escape. The flexible bellows 34 accommodates the relative angular movement of the structural portions of the constant velocity joint. Bushing 40 is installed in skirt 36 with outer surface 42 in contact with internal surface 38 of boot 30. The clamps are then placed around neck 32 and skirt 38 and tightened appropriately to assemble boot 30 to the constant velocity joint. Referring again to FIG. 2, when so installed there may be a space, indicated generally at S, at some point or points between skirt 36 and bushing 40 through which lubricant may leak or through which outside debris or fluids may enter to contaminate the lubricant inside boot 30. The size of any such space S depends on the tolerances to which boot 30 and bushing 40 are manufactured, the amount of wear on boot 30 and bushing 40, and the of clamping pressure applied by the clamp.

Figure 5:
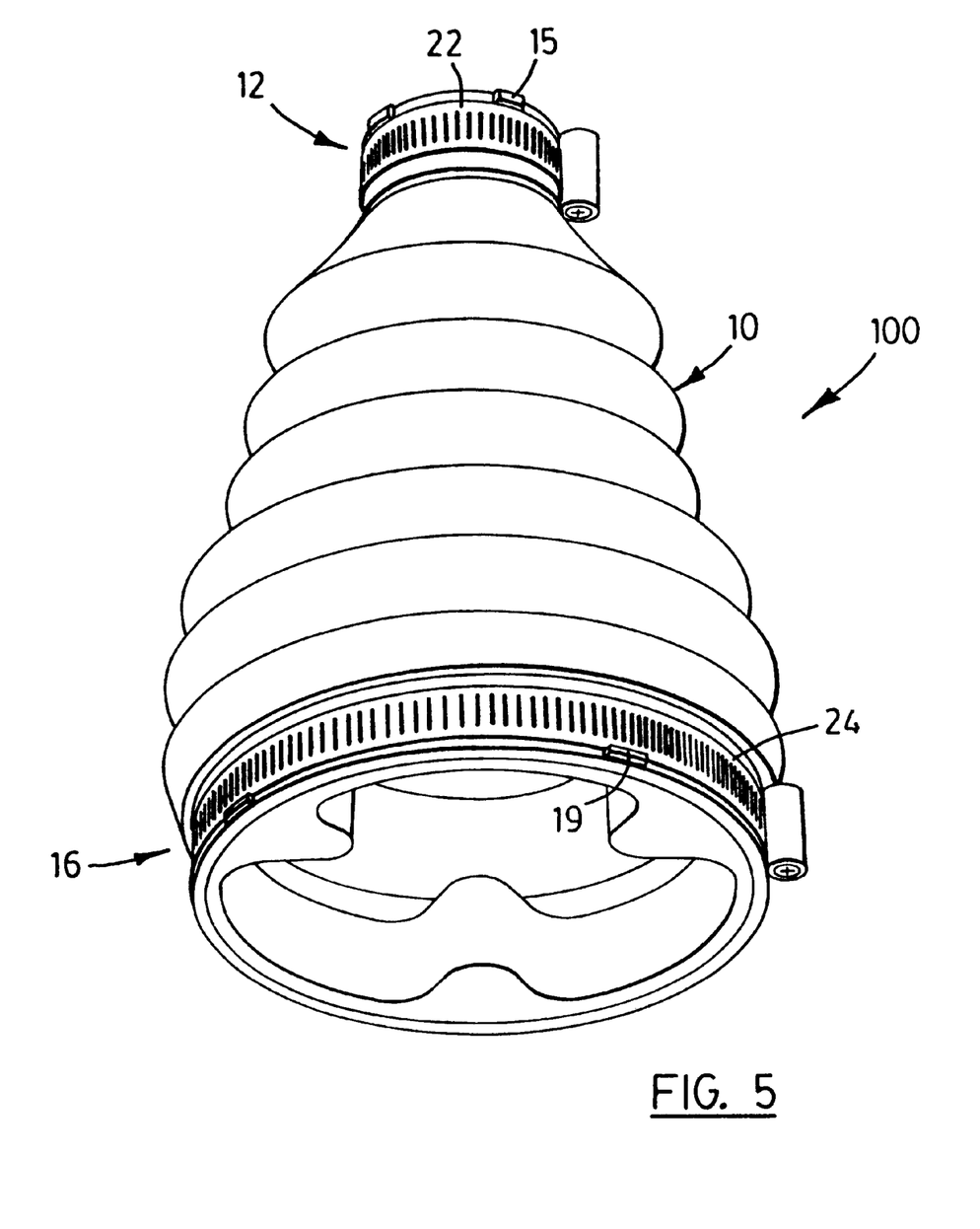
FIG. 5 is a perspective view of an assembly of the boot of FIG. 1, with encircling clamps installed thereon.

Referring to FIG. 5, in use, boot 10 according to the present invention is installed on a constant velocity joint (not shown) and is clamped in a similar fashion as boot 30 of the prior art, with hose clamps 22 and 24 at neck 12 and skirt 16, respectively, creating an assembly 100. Retainer ribs 15, 19 serve to retain in place a hose clamp 22 on neck 12 and a hose clamp 24 on skirt 16. Clamps 22 and 24 are tightened against the structure of the joint to form a tight seal so that lubricant contained within the boot 10 may not escape. Unlike boot 30 of the prior art, there is no space S between the bushing element and the skirt element of assembly 100 because boot 10 is an integral boot and bushing.

Advantageously, retainer ribs 15 and 19 also hold clamps 22 and 24 in place prior to tightening the clamps. Assembly 100 is thus completely ready to be assembled to a constant velocity joint as a single assembly. This eliminates the necessity of stocking and assembling at the automotive factory a separate inventory of clamps, boot portions and bushing portions. Rather only a single assembly 100 is required at the automotive factory, with considerable economic advantage to the automotive factory.

Figure 4:
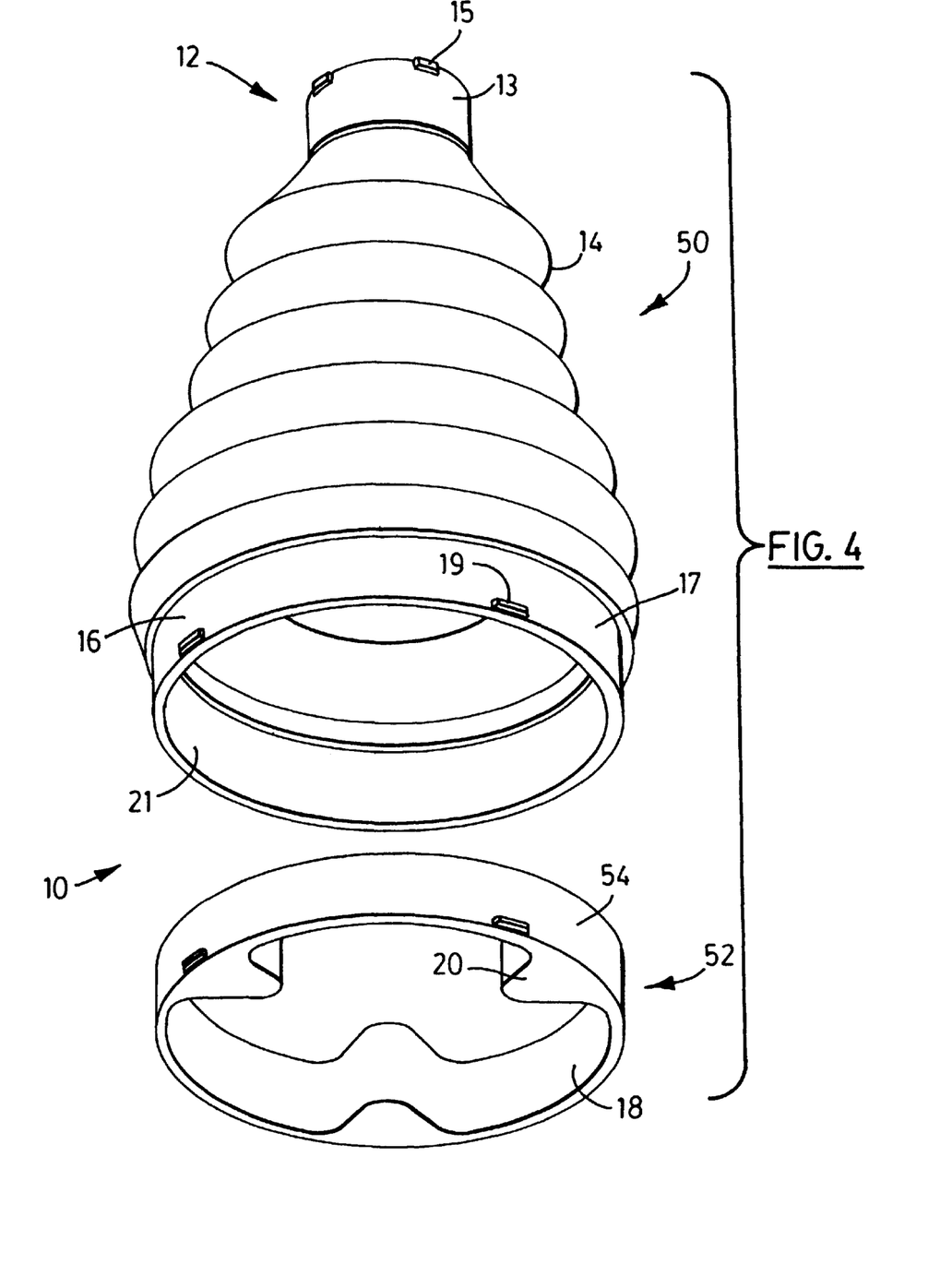
FIG. 4 shows a perspective view of the components, prior to assembly, of the boot of FIG. 1.

The steps which may be employed to manufacture the boot 10 are shown diagrammatically in FIGS. 4 and 6 through 12. Boot 10 is formed generally in a 3-step process. Referring to FIG. 4, this process comprises, generally, blow molding a boot portion 50, injection molding a bushing portion 52, inserting bushing portion 52 into boot portion 50 and thermally welding the two together.

According to one embodiment of the present method, boot portion 50 and bushing portion 52 are molded separately. Referring to FIG. 4, boot portion 50 is formed using a typical blow molding technique for molding similarly shaped articles, and may be molded identically to boot 30 of the prior art. Boot portion 50 comprises neck 12, bellows 14 and skirt 16. The skirt 16 is a generally cylindrical wall. The skirt 16 has a generally cylindrical surface 17. The internal surface 21 of skirt 16 is preferably generally cylindrical.

Bushing portion 52 is formed separately from boot portion 50, using conventional injection molding techniques. Although injection molding is preferred, it will be appreciated that other methods of forming bushing portion 52 may be used. Bushing portion 52 has an outer cylindrical surface 54 and internal surface 18 with lobes 20, shaped to matingly fit with the constant velocity joint with which the boot 10 is to be used. The outside diameter of bushing portion 52 is preferably the same as the inside diameter of skirt 16.

Figure 6:
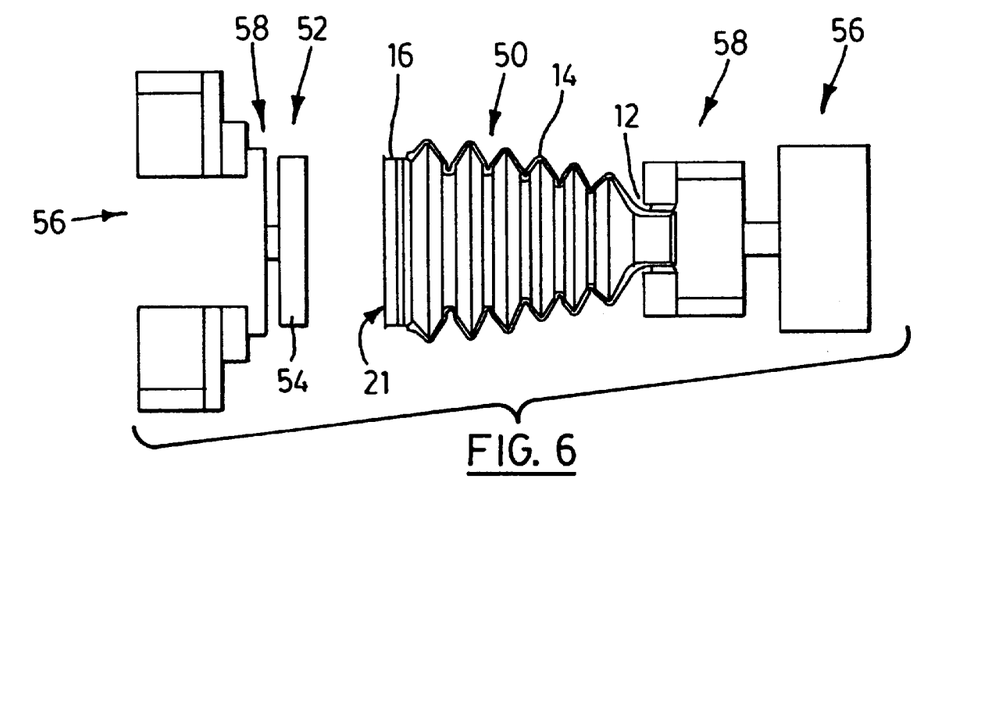
FIGS. 6 and 7 illustrate, diagrammatically, the steps of producing the boot of FIG. 1 in accordance with one aspect of the invention.
Figure 7:
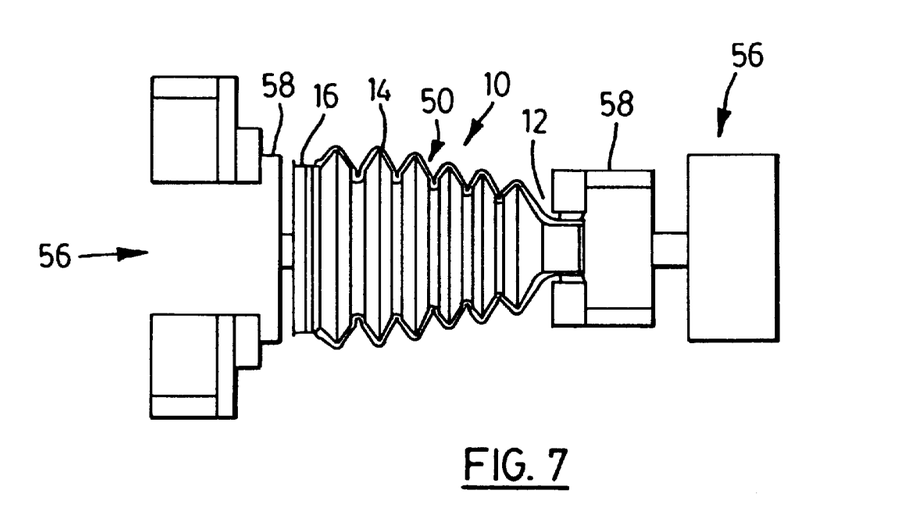

Referring now to FIG. 6, boot portion 50 and bushing portion 52 are joined in one aspect of the present method by spin welding. Boot portion 50 and bushing portion 52 are placed in a milling machine 56, or the like, and held at locations 58. Bushing portion 52 is then inserted inside skirt 16, as shown in FIG. 7, so that outer surface 54 of bushing portion 52 is in contact with internal surface 21 of skirt 16. The parts are then spun, relative to one another, the friction at surfaces 18 and 54 creating heat. The heat at least partially melts surfaces 18 and 54. When sufficient melting has occurred, the spinning is stopped and the parts are allowed to freeze, thereby fusing together. The bushing portion 52 and the boot portion 50 consequently form the integral boot 10.

Referring to FIGS. 8 to 14, in an alternate embodiment of the present method bushing portion 52 is first injection molded and boot portion 50 is then blow molded around bushing portion 52, embedding it therein.

Figure 8:
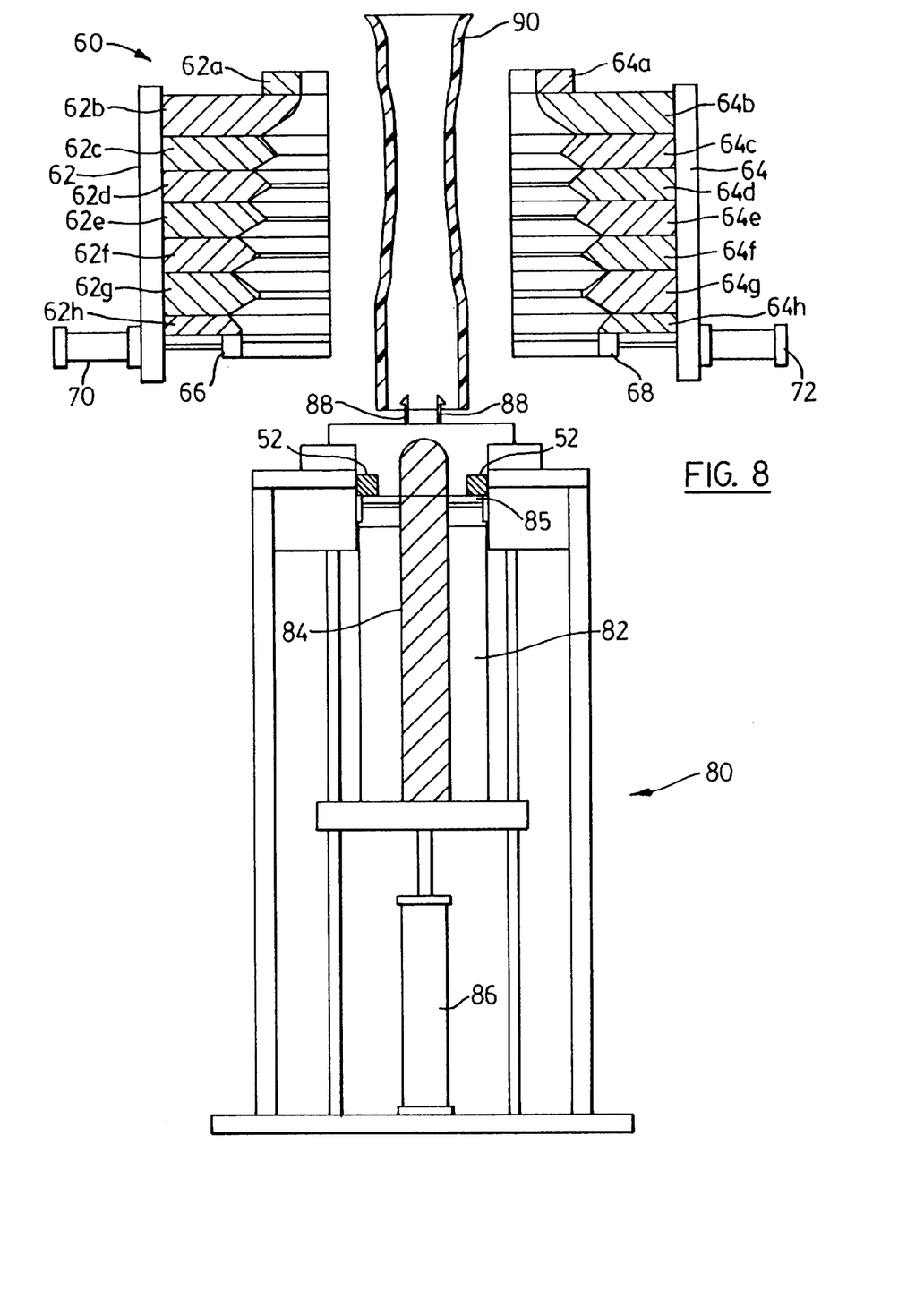
FIGS. 8 through 14 illustrate, diagrammatically, the steps of making the boot of FIG. 1 in accordance with an alternate embodiment of the invention.

Referring to FIG. 8, a typical blow mold is illustrated generally at 60. The mold 60 comprises partible mold halves 62 and 64. In order to provide a bellows-like configuration to the blow molded article, the mold halves 62 and 64 are made up of a plurality of segments. These segments are shown at 62A, 62B, 62C, 62D, 62E, 62F, 62G, 62H, and similar segments shown at 64A through H. The segments A through H of each of the mold halves 62 and 64 are fixed to one another and move as a unit. The mold halves 62 and 64 each comprise a moving slide 66 and 68 respectively. The slides 66 and 68 may be moved independently of the sections 62A through H and 64A through H by means of cylinder 70 and 72 respectively. The mold 60 is a conventional mold which may be used to manufacture boots of prior art configuration as well as the boot portions 50 of this invention. Mold 60 is contoured, in a conventional manner, at segments 62a, 64a and slides 66, 68, respectively, so that retainer ribs 15 and 19 will be formed on neck 12 and skirt 16 of boot portion 50. Located below the mold halves 62 and 64, there is a support pedestal illustrated generally at 80. The support pedestal 80 comprises a movable core 82 which contains a movable blow pin 84 and a support 85 for previously injection molded bushing portion 52. The support pedestal also includes a cylinder 86 which moves core 82 vertically relative to support pedestal 80. Support pedestal 80 also comprises a pair of fingers 88 which are movable relative to one another and to pedestal 80 in the horizontal direction.

Support pedestal 80 is located vertically below an extrusion head (not shown). Positioned on support 85 of core 82 is a previously injection molded bushing portion 52. Mold halves 62 and 64, when in the open position, permit the extrusion of a parison 90 therebetween with the parison 90 extending downwardly toward support pedestal 80.

At the commencement of the procedure in accordance with this invention, mold halves 62 and 64 are in their open position. Fingers 88 are drawn inwardly to their starting position.

With all mechanical parts as shown in FIG. 8, the first step in the process is extruding of parison 90 from the extrusion head. The parison is relatively small in diameter and hangs vertically from the extrusion head, as shown in FIG. 8. The placement of fingers 88 is such that a parison drops over the fingers, the internal diameter of parison 90 is larger than the spacing between fingers 88.

Figure 9:
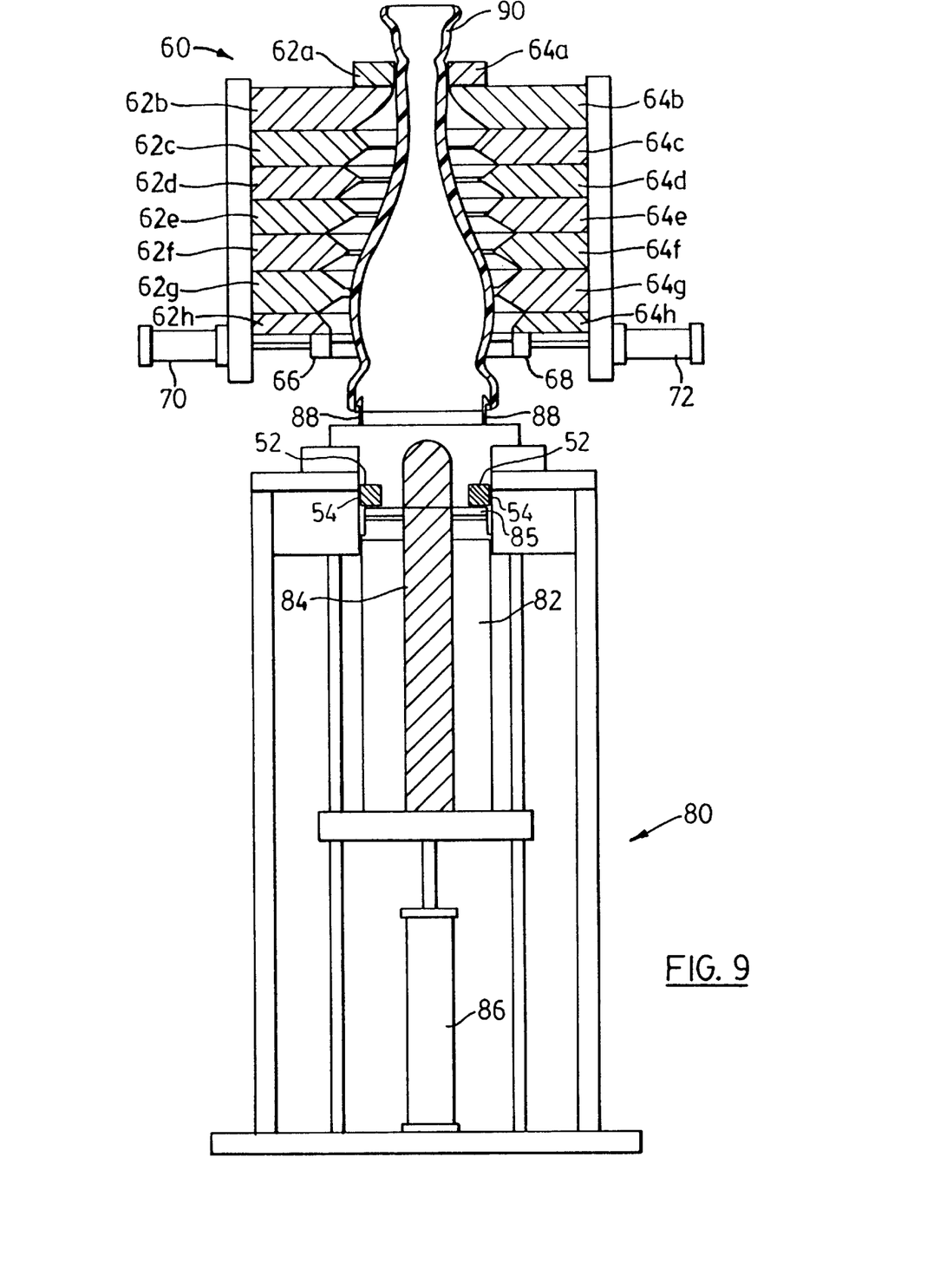

FIG. 9 shows the second stage in the process. Fingers 88 move horizontally outwardly to create a relatively large diameter opening in parison 90. Mold halves 62 and 64 have been closed to the final position.

Figure 10:
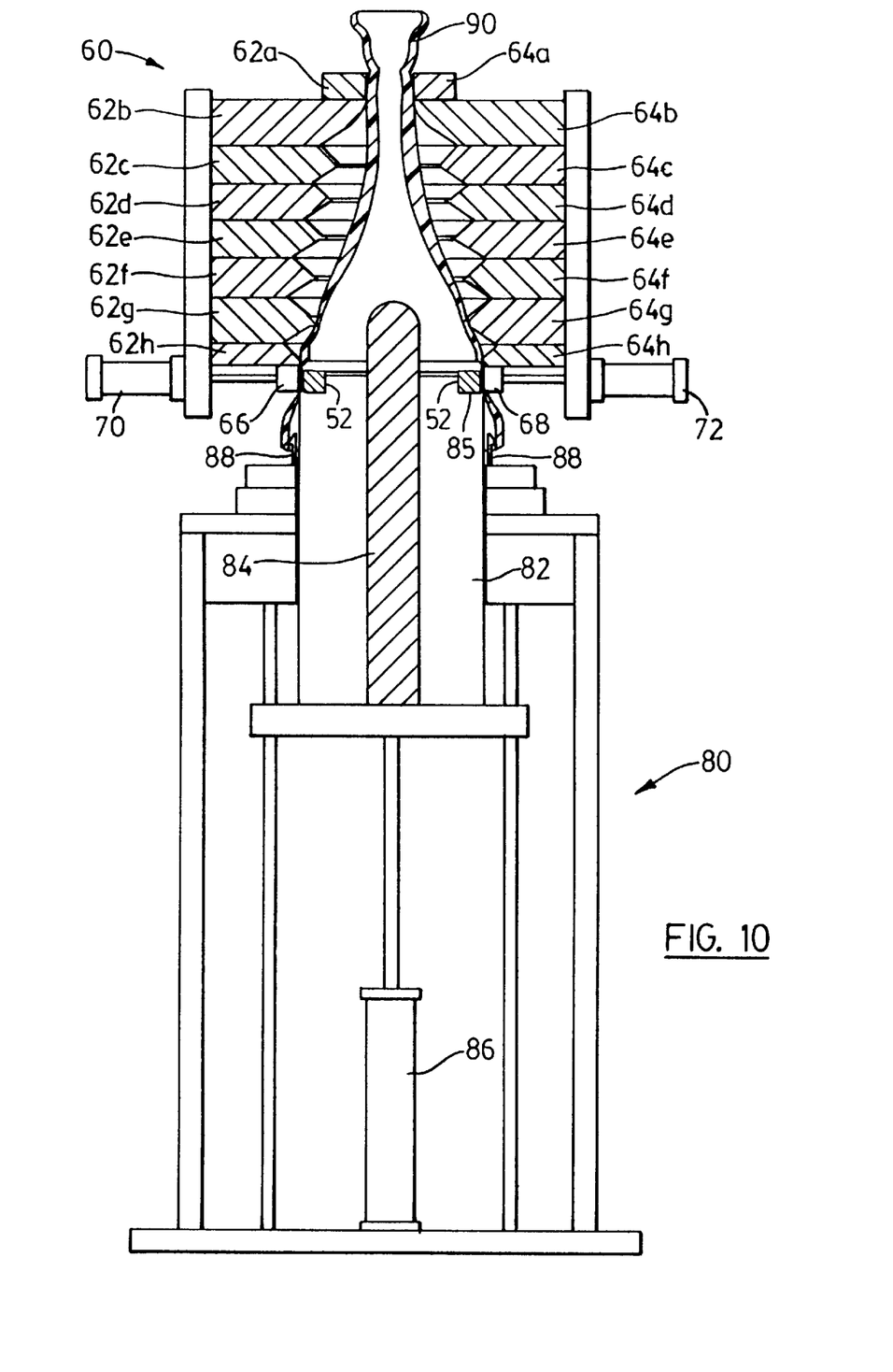

FIG. 10 shows cylinder 86 having extended, moving core 82 vertically upwardly between fingers 88 and internally to parison 90. Core 82, with bushing portion 52 in place thereon, stops in the position shown in FIG. 10. Bushing portion 52, when placed in contact with molten parison 90, partially melts along surfaces 54 which is in contact with a parison 90. Pressure between slides 66 and 68 and bushing portion 52 seals the mold in preparation for blowing.

Figure 11:
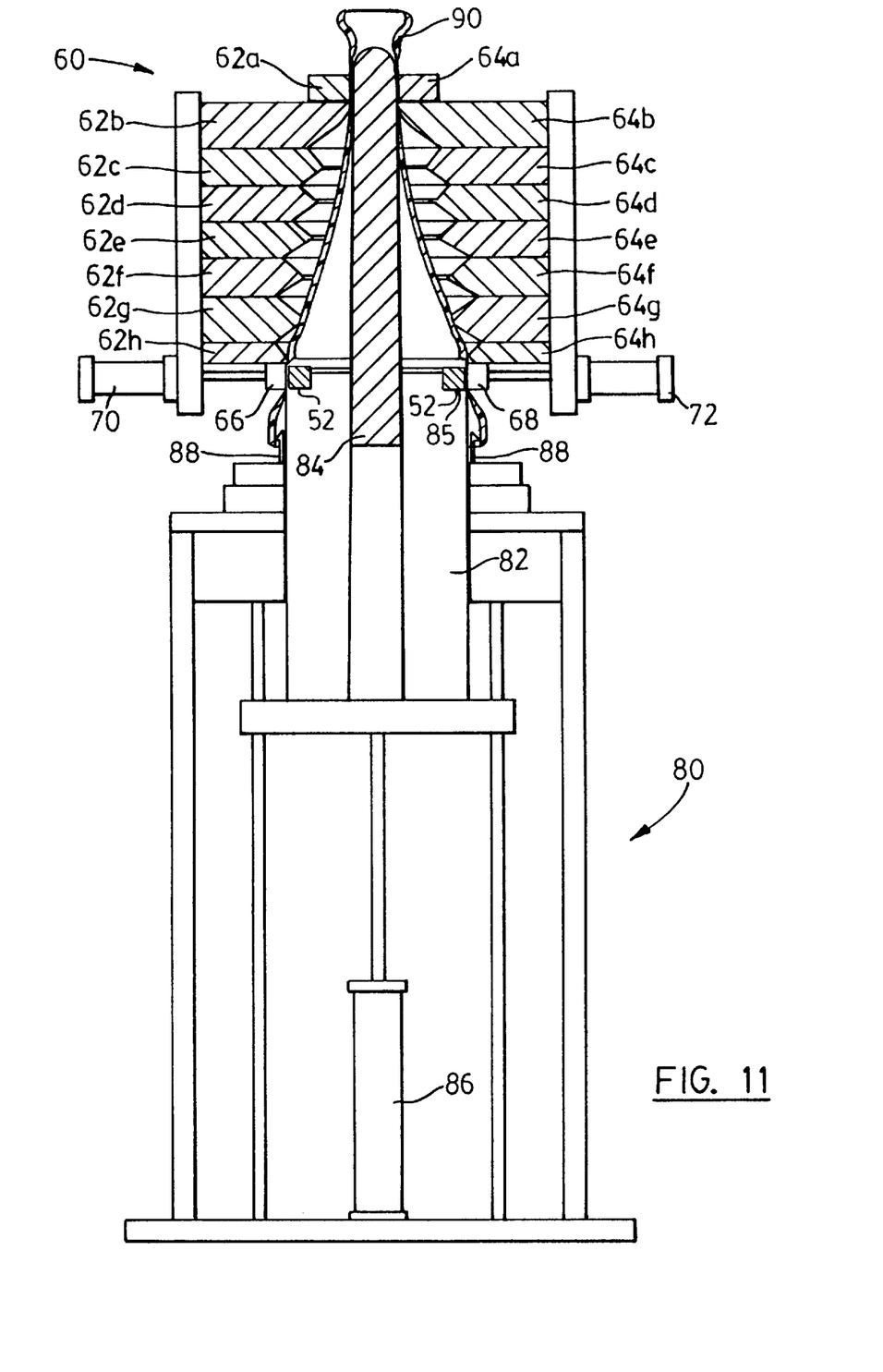

FIG. 11 illustrates the next stage in the forming process. In this stage blow pin 84 is extended vertically upwardly by means of a piston controlling relative movement between blow pin 80 and core 82. Blow pin 84 moves upwardly to engage the wall of parison 90 adjacent the upper segments 62A and 64A of mold halves 62 and 64, sealing parison 90 at the top. The interior of parison 90 is now sealed at both ends.

Figure 12:
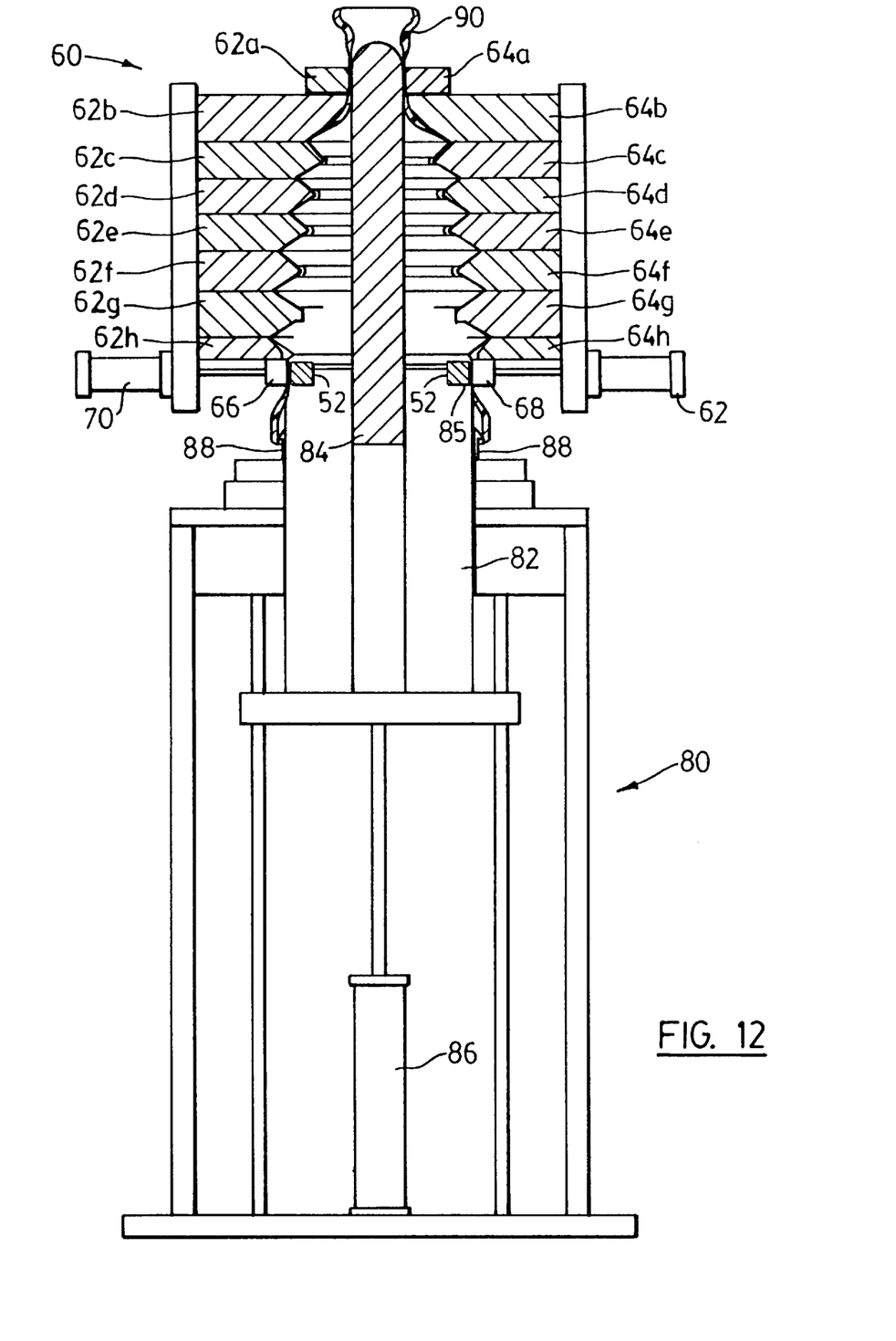

FIG. 12 shows the application of a blowing gas. Parison 90 is expanded outwardly against mold 60 to complete the shaping of boot portion 50. This step is conventional and the techniques of blow molding conventionally used are applicable to this step.

Figure 13:
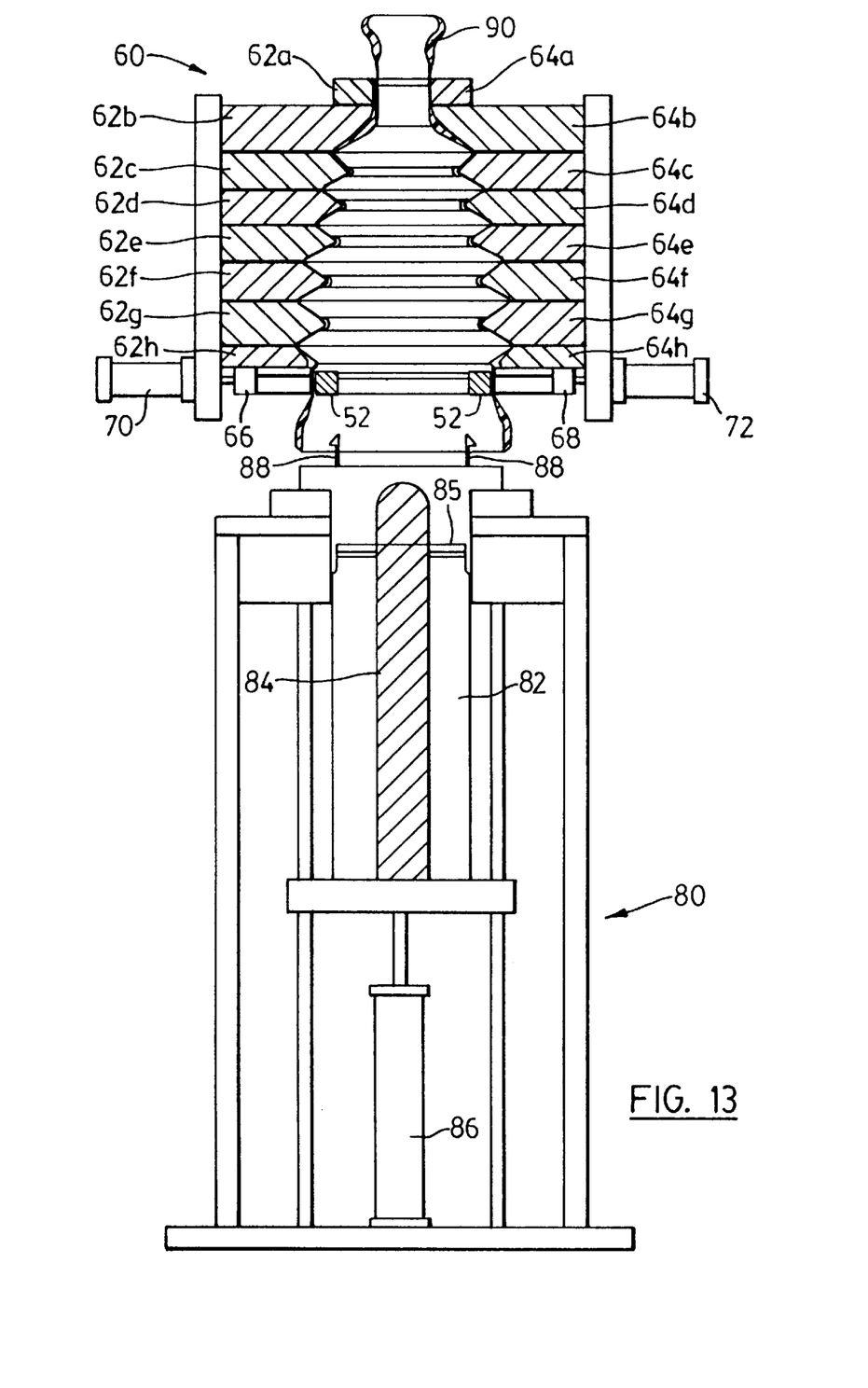
Figure 14:
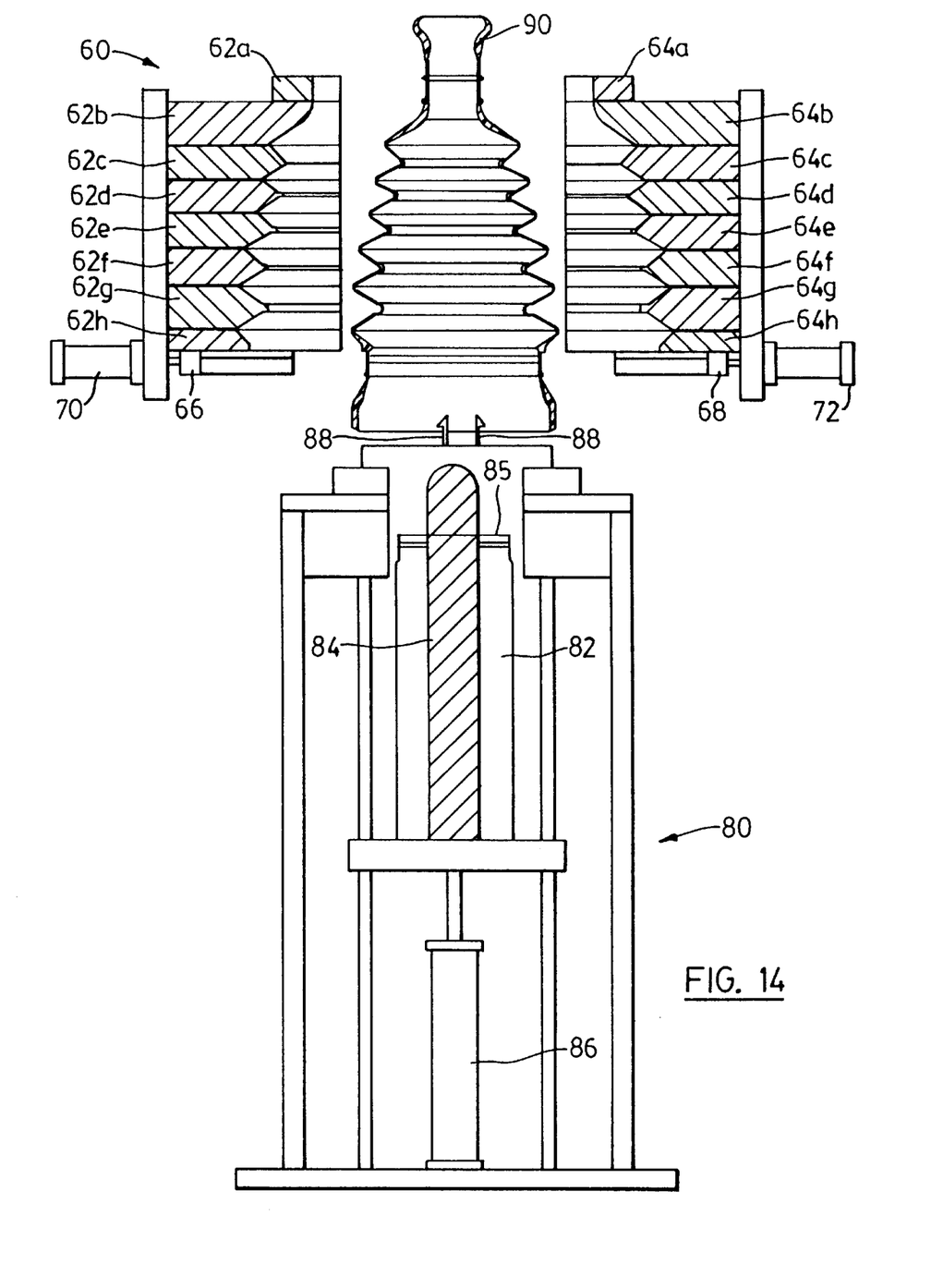

As shown in FIG. 13, blow pin 84 retracts within core 82 after the blow pressure is released. Mold halves 62 and 64 are opened and are moved to the retracted position. Moving slides 66 and 68 to the retracted position means that the outer surface of parison 90 adjacent the core 82 is no longer confined. After slides 66 and 68 have been retracted, the core 82 is withdrawn into support structure 80 by collapsing cylinder 86. Fingers 88 are returned to the starting position, and mold halves 62 and 64 open so that the completed part 10 may then be removed from the mold. In this method, boot portion 50 has been formed with bushing portion 52 integrally therein. As shown in FIG. 14, once the boot 10 has been removed from the mold, it is then trimmed for excess material at either end to give the finished part as shown in FIG. 1.

As described above, the boot of FIG. 1 thus provides a skirt 16 which has a substantially cylindrical external configuration suitable for accepting a hose clamp. The internal surface 18 of skirt 16 can be provided with a convoluted or lobed shaped having one or more projections or lobes extending inwardly which are suitable for interacting with a non-cylindrical surface of the object to which the boot is to be clamped.

It will be appreciated that using the method and apparatus described herein it is possible to create flexible blow molded bellows-like products having a non cylindrical internal surface. Any thermoplastic material capable of being used in an injection molding operation may be used for the bushing portion 52 and any thermoplastic material capable of being used in a blow molding operation may be used for parison 90 in making boot portion 50. The parts 50 and 52 need not be made of the same thermoplastic material. It has been found that HYTREL (a trademark of E.I. Du Pont De Nemours & Company) and SANTOPRENE (a trademark of Monsanto Company) are suitable for blow molding boot portion 50 and SALFLEX (a trademark of Salflex Polymers Limited), and HYTREL are suitable for injection molding bushing portion 52. In particular, the combinations as shown in Table 1 have been found to be particularly suitable combinations of materials from which to produce parts 50 and 52.

TABLE 1

Preferred Material Combinations for Boot Portion and Bushing Portion

| Boot Portion | Bushing Portion |
| --- | --- |
| SANTOPRENE 7028 | SALFLEX 364 |
| SANTOPRENE 7028 | SALFLEX 364 FOAM |
| HYTREL 8136 | HYTREL 8136 |
| HYTREL 8136 | HYTREL 8136 FOAM |
| HYTREL 8136 | HYTREL 3548 FOAM |
| HYTREL 8332 | HYTREL 8136 FOAM |
| HYTREL 8332 | HYTREL 8136 |
| HYTREL 8136 | SALFLEX 100 HS (TVPE) |
| HYTREL 8332 | SALFLEX 100 HS (TVPE) |

Figure 15:
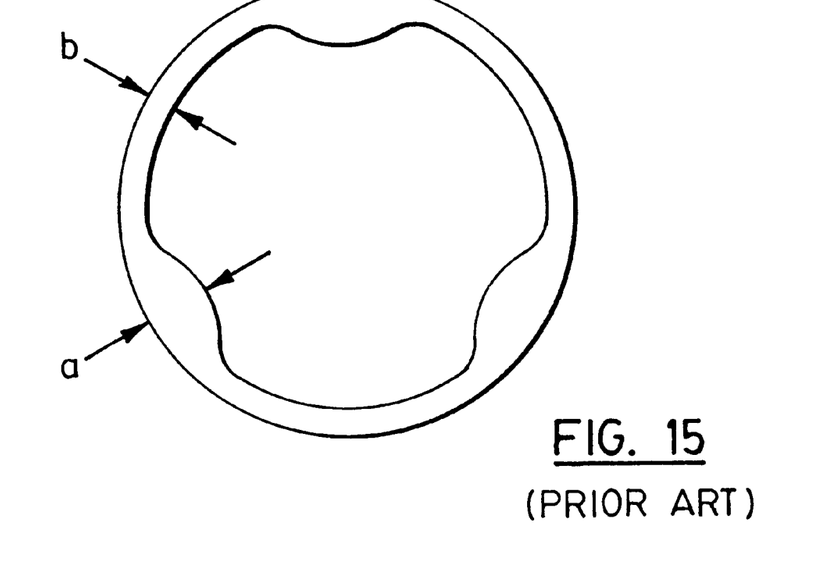
FIG. 15 shows an end view of the integral boot and bushing of the prior art.
Figure 16:
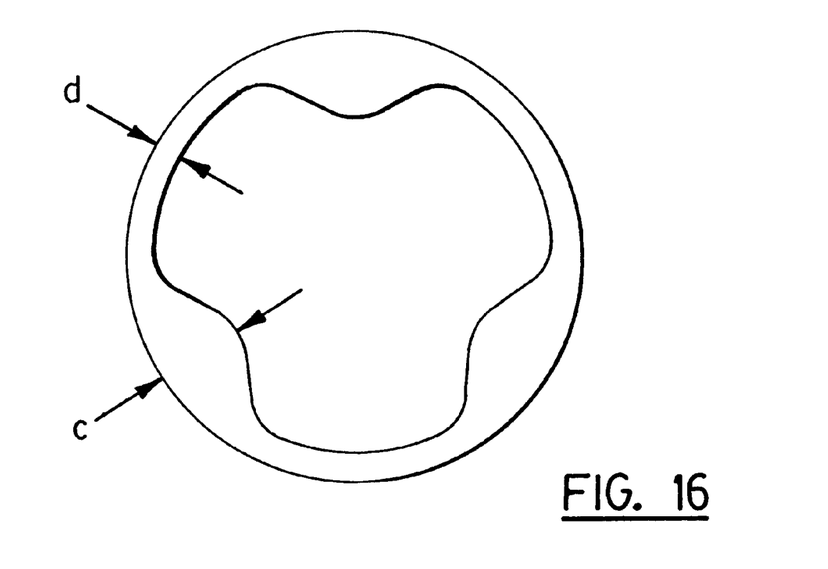
FIG. 16 shows an end view of the boot of FIG. 1.

Advantageously, the method of the present invention enables production of a boot with integral bushing, the bushing having unlimited lobe size and configuration or other features traditionally not available using blow molding techniques. Referring to FIG. 15, the method of the applicant's co-pending U.S. patent application Ser. No. 08/694, 234 is limited in the internal lobe size which it may produce. Specifically, thickness a cannot exceed four (4) times thickness b. Lobe size has no such limitation in the present invention. As shown in FIG. 16, thickness c may exceed four (4) times thickness d, if desired.

The combination of a boot and bushing in a one piece part allows for easier and quicker installation of the boot onto a constant velocity joint. The integral bushing and boot further has the advantage of preventing leakage of lubricant between the boot and bushing. Furthermore, a differing internal configuration, as compared to the external configuration gives great flexibility to the design to strengthen blow molded parts and to accommodate different shapes in mating parts.

While the above description constitutes the preferred embodiments, it will be appreciated that the present invention is susceptible to modification and change without parting from the fair meaning of the proper scope of the accompanying claims.

What is claimed is:

1. A method of producing a thermoplastic protective boot for an automotive component which has a non-cylindrical surface, which boot is required to seal against said non-cylindrical surface of said component by clamping of said boot against said non-cylindrical surface of said component, said boot having an integral bushing for sealing against said non-cylindrical surface of said automotive component when said boot is clamped against said component comprising:

a) forming a boot element having a first portion, said first portion having a generally cylindrical first wall with a generally cylindrical inner surface and a generally cylindrical outer surface, said first wall having a first diameter at said inner surface, wherein said boot element is formed by blow molding;

(b) forming a bushing element having a generally cylindrical second wall with inner and outer surfaces, said outer surface of said second wall comprising a generally cylindrical surface having a second diameter at said outer surface, said second diameter being approximately equal to said first diameter of said boot element, said inner surface of said bushing element comprising a non-cylindrical sealing surface, said non-cylindrical sealing surface of said bushing having a plurality of projections extending radially inwardly of said second wall so that said non-cylindrical sealing surface conforms to said non-cylindrical surface of said automotive component; each said projection extending only partially circumferentially around said non-cylindrical sealing surface and wherein said bushing element is formed by injection molding;

(c) positioning said bushing element so that said outer surface of said bushing element will be substantially in contact with said inner surface of said boot element; and (d) integrating said boot element and said bushing element by forming said boot element around said bushing element during said blow molding and thereby thermally fusing said elements together to seal said outer surface of said bushing element to said inner surface of said first wall of said boot element.

2. The method of claim 1 wherein said boot element and said bushing element are formed of different thermoplastic materials.

3. The method of claim 1 wherein said non-cylindrical sealing surface of said bushing element is formed having three radially inwardly projecting lobes.

4. The method of claim 1 wherein a third generally cylindrical wall is formed on said boot element at an opposite end of said boot element from said first wall.

5. The method of claim 3 wherein a bellows portion is formed on said boot element intermediate said first wall and said third wall.

* * * * *